Jan. 16, 1940.  C. G. GUTH  2,187,122
UNCRYSTALLIZABLE SUGAR AND PROCESS OF MAKING THE SAME
Filed June 7, 1934
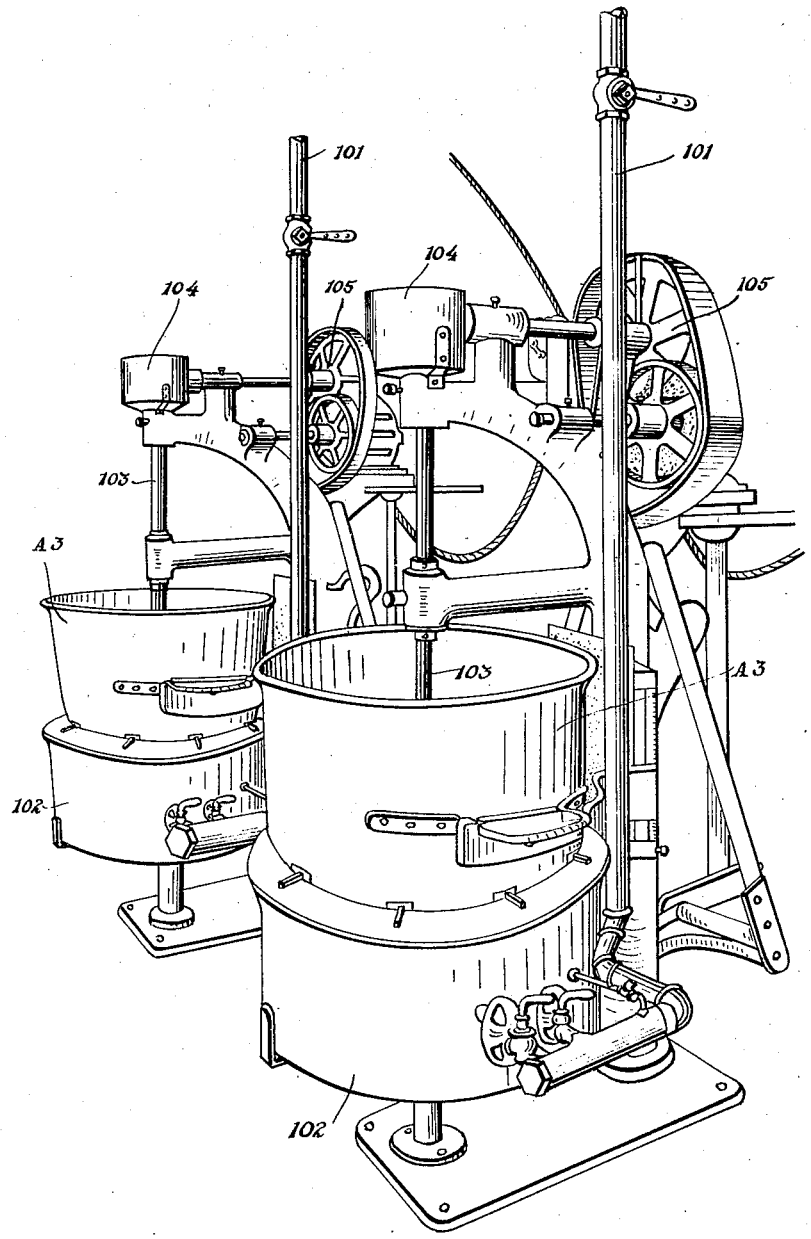
INVENTOR.
C. G. Guth
BY
ATTORNEYS.

Patented Jan. 16, 1940

2,187,122

UNITED STATES PATENT OFFICE 2,187,122

UNCRYSTALLIZABLE SUGAR AND PROCESS OF MAKING THE SAME

Charles G. Guth, Baltimore, Md.

Application June 7, 1934, Serial No. 729,525

2 Claims. (Cl. 127—30)

This invention relates to uncrystallizable sugar and methods for producing the same.

In the nature of the materials that were employed in the prior art for producing the candy confections, there were limitations which under the exigencies of the situation, the prior art felt necessary. For example, in the prior art, glucose or corn syrup has been widely used in the manufacture of candy-type confections. While it is true that for certain very limited classes of candy of the so-called "homemade" type, where the candies are made in relatively small quantities for quick sale and rapid consumption, such candies did not generally require the utilization of corn syrup or glucose, the candy under such circumstances was necessarily made in relatively small batches, usually of only twenty or twenty-five pound quantities, and could not be made on very large scale, so that generally the prior art manufacturer of candy and similar type confections invariably has involved the utilization of glucose or corn syrup in substantial amount.

Glucose or corn syrup has long been recognized as an undesirable ingredient from many standpoints, but its use has been made necessary for a number of reasons. In the first place, it is, of course, a relatively cheap constituent, much cheaper than sugar, and has been widely used as a cheapening, sweetening agent. But glucose or corn syrup has also been widely employed in connection with the manufacture of even expensive types of candy confections, because for certain types of such confections, the necessary properties and characteristics of the final product could not be obtained in the prior art without the utilization of glucose. Thus, for example, in the production of chewing types of candy, including for example, caramels, nougats, kisses, taffy, gum drops, hard candies, brittles, such as peanut brittle, marsh mallows, fudge, etc., glucose or corn syrup was a necessary constituent under prior art methods in order to obtain products of the necessary chewy characteristics, or in order to prevent crystallization of sugar, etc. So that, glucose or corn syrup was thus widely used in connection with practically all kinds of such candy products, and also all kinds of cream bonbons and cream fillings, as in chocolate covered confections in order to obtain the necessary consistency and other characteristics in the finished product.

And such practice has been followed although glucose or corn syrup has long been recognized as an undesirable ingredient for internal consumption, but its utilization in the manufacture of such confections was accepted as more or less a necessary evil in the prior art.

Objects and advantages include the production of novel types of sugar materials or derivaties of entirely wholesome characteristics, possessing all of the desirable features required in the production of candy confections, without the deficiencies and undesirable properties or qualities of glucose or corn syrup type materials.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In connection with that more detailed description, there is shown in the accompanying drawing, in the figure, equipment and machinery that may be employed in the production of candy type confections, without the employment of glucose or corn syrup.

It has been found possible to dispense entirely with the utilization of glucose or corn syrup in the production of any of these types of candy confections as desired, by utilizing in lieu thereof uncrystallizable sugar products in liquid condition produced from crystallizable sugars, such as cane sugar. These novel types of products produced from crytallizable sugars in accordance with the present invention are hereinafter referred to as liquate sugar. For example, it has been found that ordinary crystalline cane sugar by proper treatment may be converted into a fluent or liquid material without the use of any chemical or preservative whatsoever, the resulting product showing no tendency to go over into a crystalline condition, or to revert to its original sugar state. Such liquate sugars are thereby utilizable in the production of candy confections in lieu of glucose, and yield products that are chewy and tender, and of great importance, the entire sugar content when such liquate sugar is employed, is entirely soluble, a condition which is not obtainable with glucose.

In carrying out this phase of the invention, the crystalline sugar is subjected to heat treatment with gradually increasing temperatures, and without the addition of water or any moisture for a length of time sufficient to convert the crystalline material initially used into liquate condition. Such condition is secured without any substantial burning or deterioration in taste or color.

Illustrating the invention by the utilization of cane sugar, for exampe, the sugar is started absolutely dry and without the addition of any water or moisture, and is subjected to a gradually increasing temperature until at the end of the process, the temperature of the material is in excess of 350° F., the material undergoing treatment desirably being subjected to agitation or stirring. It is a noteworthy fact that whereas ordinarily sugar cannot be boiled, either by fire or vacuum processes at temperatures higher than 320° F. without burning or deterioration in taste and color, in accordance with the present method, the sugar is converted into liquate condition in which it retains its substantially liquid condition without exhibiting any tendency to crystallization or reversion to its original sugar state.

Such liquate sugar may then be employed in lieu of glucose or corn syrup in the manufacture of all types of candy confections, including cream bonbons and cream candies of every sort and description, of the character employing cream fillings in chocolate covered confections; in the production of caramels, both wrapped and chocolate covered, nougats, wrapped and chocolate covered; all kinds of chewing kisses, including butter scotch, caramel, molasses, salt water taffy, etc.; gum drops; hard candy; all sorts of brittles, such as peanut brittle; marsh mallows; cocoanut royals, and all kinds of cocoanut goods; fudge, and for any and all other types of candies and confections that heretofore could not be manufactured without the use of glucose.

The utilization of the liquate sugar in the production of such candy-type confections may be illustrated by the production of caramels. The milk, butter and cream are placed in a kettle, and brought to a boil. The liquate sugar, produced as above described, and at a temperature of about 260° F., is admixed with the heated milk, butter and cream. The mass is then desirably cooled rapidly to a temperature of about 140° F., this rapid cooling between the temperature of mixture of about 260° F. down to about 140° F. is for the purpose of preventing discoloration in the caramel or molasses type goods. And rapid cooling at this range is found materially to prevent any substantial discoloration in the goods. Where, of course, discoloration is of no moment, the rapid cooling is not required. After the mass has been cooled to 140° F. it may be deposited directly in pans, where it is cooled either by forced draft of air or permitted to cool, and from which pans the caramel or molasses type goods may pass to the cutter, and if desired to a chocolate coating machine.

In the production of molasses type products, such as molasses plantations, and in any case where the material requires a pulling operation, after it has cooled in the pans as set forth above, and before passing to the cutter, the material may be pulled, and then passes to the cutting and if desired chocolate coating machines.

The apparatus shown in Figure 3 of the drawing illustrates a means by which the liquate sugar and the caramel type goods may be produced. Referring to the drawing, a series of sugar treating kettles may be set up as illustrated at A³, there being as many such kettles as desired. Each kettle is provided with means for heating the same, including desirably valve-controlled pipes 101, 101, which admit steam to the jacket 102, 102 for heating the kettles A3. Desirably the kettles are provided with means for agitation or stirring, including the stirrers 103, 103, geared as shown at 104, 104 for operation by any desired motor driven means 105, 105.

The dry sugar is placed in the kettle A3, the agitators 103 are started, and the steam is turned on, the temperature being gradually raised over a period of treatment, for example, of about 25 minutes, depending on the size of the batch undergoing treatment, with gradually increasing temperature until at the end of the operation the temperature has reached approximately 350° F., constant agitation or stirring being employed during the operation. By the time that the material has reached this temperature, it will have been found to have been converted to its liquate condition in which it is a fluid material, which shows no tendency to revert to its former crystalline condition, there having been no substantial discoloration or caramelization, or any substantial change in taste and color of the sugar. But its physical condition at least has been very materially altered by this condition, so that a liquid product has been obtained which may desirably be employed in the manufacture of candy goods, as set forth above.

Having thus set forth my invention, I claim:

1. The method of converting sugar to an uncrystallizable liquid condition, which comprises subjecting substantially dry sugar in the substantial absence of water to a gradually increasing temperature, the final temperature reached being approximately 350° F., and stirring the material during the heating operation, the heat treatment being continued until the sugar has been converted into a permanently liquid condition without substantial change in taste and color.

2. A permanent liquid sugar obtain by gradually heating cane sugar above its melting point, said liquid sugar being substantially free from taste and color of caramelization products.

CHARLES G. GUTH.